United States Patent [19]

Borror et al.

[11] Patent Number: 4,663,518

[45] Date of Patent: May 5, 1987

[54] OPTICAL STORAGE IDENTIFICATION CARD AND READ/WRITE SYSTEM

[75] Inventors: Alan L. Borror, Andover; Ernest W. Ellis, Carlisle; Faramarz Faramarzpour, Sudbury; Hugh R. Mackenzie, Belmont; Donald A. McGowan, Stoneham, all of Mass.

[73] Assignee: Polaroid Corporation, Cambridge, Mass.

[21] Appl. No.: 793,176

[22] Filed: Oct. 31, 1985

Related U.S. Application Data

[63] Continuation-in-part of Ser. No. 646,771, Sep. 4, 1984, Pat. No. 4,602,263, and a continuation-in-part of Ser. No. 740,889, Jun. 3, 1985, abandoned.

[51] Int. Cl.⁴ .............................................. G06K 7/10
[52] U.S. Cl. .................................... 235/487; 235/468
[58] Field of Search .................. 235/487, 468; 283/7; 358/130; 346/135.1

[56] References Cited

U.S. PATENT DOCUMENTS

| | | | |
|---|---|---|---|
| 3,873,813 | 3/1975 | Lahr et al. | |
| 3,894,756 | 7/1975 | Ward | 283/7 |
| 4,090,031 | 5/1978 | Russell | 358/130 |
| 4,179,686 | 12/1979 | Bonicalzi et al. | |
| 4,360,728 | 11/1982 | Drexler | 235/462 |
| 4,412,231 | 10/1983 | Namba et al. | 346/135.1 |
| 4,500,777 | 2/1985 | Drexler | 235/487 |
| 4,538,059 | 8/1985 | Rudland | 235/468 |
| 4,542,288 | 9/1985 | Drexler | 235/487 |
| 4,544,835 | 10/1985 | Drexler | 235/487 |

Primary Examiner—Harold I. Pitts
Attorney, Agent, or Firm—Edward S. Roman

[57] ABSTRACT

An identification card comprises a single media having a plurality of different heat sensitive image forming dye compounds on which are encoded a colored pictorial image of the card holder, colored text, and machine readable digital data. A laser printing method is also provided for activating the heat sensitive image forming dyes to provide the colored pictorial image of the card holder, the colored text and the machine readable digital code.

24 Claims, 5 Drawing Figures

OPTICAL STORAGE IDENTIFICATION CARD AND READ/WRITE SYSTEM

CROSS REFERENCE TO RELATED PATENT APPLICATIONS

This invention is a continuation-in-part of U.S. patent application Ser. No. 646,771, entitled "Thermal Imaging Method", by A. Borror et al., filed Sept. 4, 1984, now U.S. Pat. No. 4,602,263, and U.S. patent application Ser. No. 740,889, entitled "Thermal Imaging Method", by A. Borror et al., filed June 3, 1985, now abandoned.

BACKGROUND OF THE INVENTION

1. Field of the Invention

This invention relates generally to an identification card and method for making the same and, more particularly, to an identification card having a single media and method for encoding the identification card with a colored pictorial image, colored text and machine readable digital code.

2. Description of the Prior Art

Identification cards such as credit cards, driver's licenses, etc. have employed a variety of means to avoid counterfeiting. In order to avoid the use of such identification cards by those who are not legitimate card holders, a photographic colored image of the card holder has been applied for visually recognizing the legitimate owner of the card at the time that the card is used. Such photographs are generally made by conventional photographic processes including instant photography. The photograph may thereafter be placed on a card having descriptive text printed thereon by some conventional printing process entirely distinct from the photographic process by which the pictorial image of the card holder was made. The photographic image of the card holder may thereafter be connected to the card by any conventional process, one example of which comprises the laminating of two exterior plastic sheets together to contain the photograph and card therebetween. Such identification cards are not absolutely tamper proof in that the laminated exterior plastic sheets may be separated to alter or change the photographic image of the card holder.

Most recently, it has been suggested that a code comprising characteristic parameters of the photographic image of the card holder be stored on the identification card. The authenticity of the card holder can then be verified by scanning the photographic image of the card holder and thereby redetermining the characteristic parameters of this image and comparing the same with the parameters of the corresponding code on the identification card. Thus, the risk of counterfeiting is greatly reduced since an alteration or change in the photographic image of the card holder will be quickly detected. An example of the aforementioned identification card is disclosed in U.S. Pat. No. 4,179,686, entitled "System for Checking the Authenticity of Identification Papers", by M. Bonicalzi et al., issued Dec. 18, 1979. The colored image of the card holder is still suggested to be a photographic black-and-white image or, alternatively, a photographic color image or transparency which then must be connected to the identification card. The code is recorded by apparatus distinct and apart from the photographic imaging apparatus which records the photographic image of the card holder, and means must be provided for independently connecting both the code to the card as well as the photographic image and thereafter providing some kind of visual text on the card through a conventional printing process.

Therefore, it is a primary object of this invention to provide an identification card having a single media on which colored pictorial images of the card holder, colored text, and machine readable digital code may be recorded by the same recording apparatus.

It is a further object of this invention to provide a laser printing method for printing on the surface of an identification card, a colored pictorial image of the card holder, colored text and optically encoded digital data.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An identification card comprises a substrate on which are disposed first, second and third color imaging compounds each responsive to incident radiation within a different select range of spectral wavelengths for affecting a visually discernible change in the spectral absorption characteristics thereof. At least one portion of the identification card is selectively exposed to radiant energy within the different ranges of specular wavelengths to provide a visually discernible colored image. Another portion of the identification card outside of the first portion is also selectively exposed to radiant energy within either one or all of the different ranges of specular wavelengths to provide a non-visually understandable machine readable code.

The identification card may be printed by scanning a composite laser light beam having spectral wavelengths within the different select ranges of spectral wavelengths of the imaging layers while simultaneously modulating the intensity of each portion of the composite laser beam to selectively expose any one of the imaging layers and thereby provide the visually discernible colored image within the first portion. At least one laser light beam is scanned across the second portion of the identification card while being simultaneously modulated in intensity to selectively expose at least one of the imaging compounds within the second portion to radiant energy to thereby record the machine readable code. The different colored imaging layers may also contain infrared absorbing substances for converting the infrared radiation into heat. In one embodiment the infrared absorbing substances have different spectral absorption characteristics within selected ranges of spectral wavelengths, and the selected ranges of spectral wavelengths for the composite laser light are matched to the spectral absorption characteristics of the infrared absorbing substances so that each imaging compound may be exposed by a component of the composite laser light. Alternatively, the infrared absorbing substance connected with each imaging compound may have the same spectral absorption characteristic in which case each imaging compound is addressed by varying the focus of the incident laser beam.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENT

Figure 1:
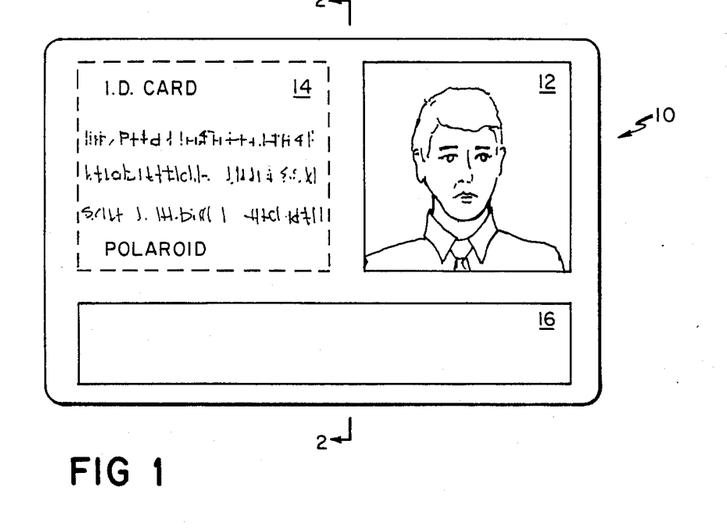
FIG. 1 is a top plan view for the identification card of this invention.

Referring now to FIG. 1, there is shown the identification card 10 of this invention having a size common to most credit cards. Preferably, the identification card is substantially 85 mm long by 54 mm wide; and, although these dimensions are not absolutely critical, they are generally preferred because this size easily fits into a wallet and has been historically adopted as a convenient size for automatic teller machines and the like. The identification card 10 of this invention is divided into three areas as shown generally at 12, 14 and 16. The area 12 which is preferably 1¼ inches by 1¼ inches defines that space on the idenfication card 10 delegated to having a pictorial image of the card holder exposed thereon in the manner of this invention. The adjacent area 14 which preferably is in the order of 1½ inches by 1¼ inches shows that portion of the identification card 10 dedicated to having visual text exposed thereon. The last area 16 of the identification card 10 which preferably is in the order of 3 inches long by ½ inch wide shows that portion of the identification card delegated to having optical digital data stored thereon in the manner of this invention to be subsequently described.

Figure 2:
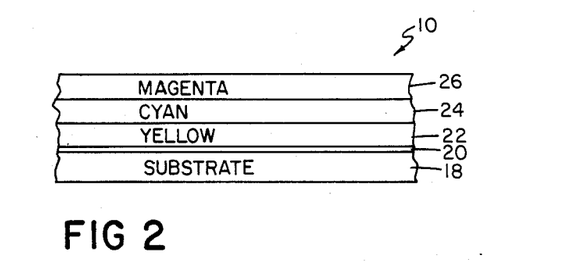
FIG. 2 is a cross-sectional view of the identification card of FIG. 1 taken along the lines 2—2.
Figure 3:
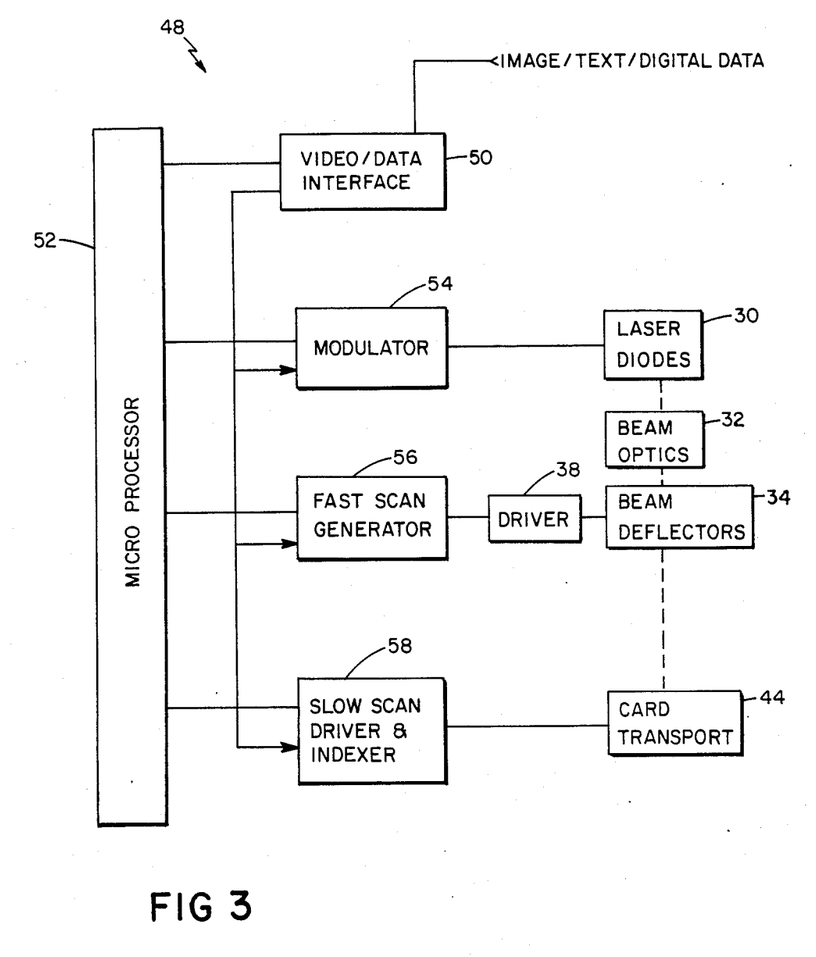
FIG. 3 is a block diagram for the laser printing apparatus of this invention.

Referring now to FIG. 2, there is shown in cross section the preferred laminar structure for the identification card 10. A card supporting layer as shown generally at 18 preferably comprises a plastic substrate such as polyethylene, polypropylene, polycarbonate, cellulose acetate, polyethylene terephthalate or polystyrene. Alternatively, the supporting substrate could comprise paper, paper coated with a resin or pigment, such as calcium carbonate or calcined clay, synthetic papers etc. The substrate 18 is preferably overlayed with a metallized layer 20 such as aluminum which may be applied in a conventional manner by any wellknown vacuum deposition technique. Overlying the metallized layer 20 there are provided three color imaging layers as shown at 22, 24 and 26 each comprising a heat sensitive organic compound. The color imaging layers 22, 24 and 26 are preferably selected to give respectively the subtractive colors yellow, cyan and magenta as commonly employed in photographic processes to provide full natural color. Although the heat sensitive dye compounds are shown as preferably comprising the subtractive colors cyan, magenta and yellow, it will be well understood that they could alternatively comprise the additive primary colors red, green and blue and still provide the desired color or combination of colors. In addition, although the heat sensitive magenta compound dye is shown as comprising the top layer of the laminar identification card structure, it is by no means required and any one of the color imaging layers could be substituted in position with any other one of the color imaging layers.

One example for the heat sensitive yellow dye compound layer 22 is shown by the following formula.

Preparation of the above compound was accomplished as provided in the following description.

(a) In a 500 ml threeneck roundbottom flask equipped with a mechanical stirrer, a thermometer, an addition funnel and a vent to an exhaust bubbler, ethyl m-aminobenzoate (11.5 g, 0.07 mole) was dissolved in a solution of 140 ml of water containing 22 ml of conc. hydrochloric acid. The almost colorless solution was cooled in an ice-salt bath to $-1°$ C. and a solution of sodium nitrite (5.07 g, 0.0735 mole) in 25 ml of water was added beneath the surface of the aniline.HCl solution over a period of 30 minutes while stirring. After stirring for another 20 minutes in the cold, the reaction mixture gave a positive test for $HNO_2$ with starch iodide paper. Sulfamic acid is then added until no $HNO_2$ could be detected by the starch iodide test. While the reaction mixture was stirred at $-2°$ C. 1,3,3-trimethyl-2-methyleneindoline (12.13 g, 0.07 mole) is added dropwise over a period of 1.5 hours while stirring. The reaction temperature was kept below $0°$ C. The reaction mixture was diluted with about 500 ml of brine solution and the orange solids collected on a filter. The solids were recrystallized from 300 ml of boiling water to yield 13.5 g. of 2-formyl-1,3,3-trimethyl-(3H)-indolium chloride m-carbethoxyphenyl-hydrazone of formula L below after drying over $P_2O_5$ in vacuum. $\lambda_{max}$ 445 nm/Epsilon 42,000 as measured in methanol.

(L)

(b) Compound L (8.5 g, 0.022 mole), 150 ml of methylenechloride and 50 ml of water were charged into a 500 ml threeneck roundbottom flask equipped with a mechanical stirrer, thermometer and nitrogen inlet and outlets. The mixture was rapidly stirred at $21°$ C. under a nitrogen atmosphere while KCN (5.54 g, 0.085 mole) was added portionwise during about 5 minutes. After rapid stirring at room temperature for 48 hours, the orange organic phase was separated and dried over sodium sulfate. (The excess cyanide in the water layer was destroyed by the addition of cold NaOCl). The organic phase was evaporated under reduced pressure to yield 8.71 g of orange solids. The solids were triturated with 200 ml of ether and filtered to give 5.88 g of a yellow solid. The solid sample (5.88 g) was rich in the new compound, 2-cyano-2-formyl-1,3,3-trimethylindoline m-carbethoxyphenyl hydrazone of formula M below.

(M)

(c) A 500 ml threeneck roundbottom flask equipped with a thermometer, nitrogen inlet and outlet, a condenser, and a magnetic stirrer was charged with 150 ml methylene chloride, di-tert-butyl-dicarbonate (5.24 g, 0.024 mole) 4-dimethylaminopyridine (1.32 g, 0.019 mole) and Compound M (7.33 g, 0.019 mole) as a solids mixture which contained about 30–40% of the ionic cyanide species. The orange solution was stirred under a nitrogen atmosphere at room temperature overnight. After washing the reaction solution with water (3×75 ml), it was dried over sodium sulfate and evaporated under reduced pressure to yield 14.6 g of an orange syrup. Thin layer analysis (silica gel eluted with a mixture ethyl acetate/n-hexane-3:7) revealed a new colorless compound and a yellow compound that corresponded to the unreacted ionic starting compound component. The new compound was isolated by preparative column chromatography (silica gel column eluted with 3:7 ethyl acetate/n-hexane) to yield 9.2 g of the title compound as an almost colorless solid. The assigned structure was supported by mass spectroscopy and NMR.

An example of the heat sensitive cyan dye compound of layer 24 is shown by the following formula.

Compound 3A and 5.84 g of phosphorus oxychloride dissolved in 120 ml of chloroform were refluxed for 5 hours and then allowed to stand at room temperature overnight. The reaction mixture was stirred vigorously with 42 ml water for about 20 minutes, then transferred to a separatory funnel and the organic layer separated. The chloroform layer was washed twice with 50 ml portions of water then dried over magnesium sulfate. After filtering to remove the magnesium sulfate, the solution was cooled to 0° C. and 8.55 g of 4-dimethylaminopyridine was added portionwise over 10 minutes. A small amount of chloroform was added for dilution. Then 7.56 g of o-phenylene diamine dissolved in a minimum amount of chloroform was added dropwise to the solution over 30 minutes. The reaction mixture was allowed to come to room temperature and stirring was continued for 4 hours. The reaction mixture was filtered and the volume reduced to about 80 ml. The mixture was then injected onto a high pressure silica gel column and eluted with 2 liters of hexane followed by 2 liters each of 5% ethylacetate/hexane, 10% ethylacetate/hexane, 15% ethylacetate/hexane and 20% ethylacetate/hexane. 770 mg of the following compound was recovered.

Preparation of the above compound was accomplished as provided in the following description.

8 grams of the compound having the formula

Compound 3B

770 mgs. of Compound 3B was dissolved in a minimum of methylene chloride. Sodium bicarbonate (4 equivalents) was added and the reaction mixture was stirred biskly under nitrogen. Four equivalents of phenylchloroformate was added dropwise over 30 minutes at room temperature and the reaction was allowed to stir overnight. The reaction mixture was filtered and applied to a medium pressure silica gel column conditioned with hexane and eluted with hexane, 5% ethylacetate/hexane, 10% ethylacetate/hexane, 15% ethylacetate/hexane and 20% ethylacetate/hexane. 340 mg of the title compound was recovered as a light greenish-white solid.

An example of the heat sensitive magenta dye compound of layer 26 is shown by the following formula.

Preparation of the above compound was accomplished as provided in the following description.

To a solution of 66 g (0.09 mole) of Compound 2A of the following formula dissolved in 450 ml of methylene chloride

Compound 2A was added 20.56 ml (0.216 mole) of dimethyl sulfate and 3.06 g of tetrabutylammonium hydrogen sulfate. A sodium hydroxide solution, 9.24 g (0.231 mole) in 150 ml of water, was added to the reaction mixture dropwise over 90 minutes. The resulting mixture was stirred at room temperature for four hours after the addition was complete. Another solution of 16.5 g (0.42 mole) of sodium hydroxide in 280 ml of water was added in one portion to the reaction mixture which was then stirred for an additional five hours. The organic layer was separated and diluted with 330 ml of methylene chloride. This solution was then dried by distilling off approximately 300 ml of solvent and the residue comprising the corresponding bis N-methyl compound (Compound 2B) was cooled to room temperature.

Compound 2B

To the dried residue (2B) was added 21.9 ml (0.234 mole) of phosporus oxychloride and 1.5 ml (0.015 mole) of N-methylpyrrolidinone. The reaction mixture was heated to reflux and stirred for six hours and then cooled to room temperature. 22 g (0.18 mole) of 4-dimethylaminopyridine in a minimum amount of methylene chloride was added dropwise followed by the portionwise addition of 48 g (0.45 mole—5 equivalents) of o-phenylene diamine in 400 ml of methylene chloride over 30 minutes. The reaction temperature during and after addition was maintained between 20° and 25° C. The reaction was stirred at 20° C. for four hours and then at 40° C. for two hours. Silica gel TLC of a sample in 20% ethylacetate in hexane indicated that the reaction was substantially complete. The reaction mixture was filtered, reduced in volume to about 200 ml and purified by silica gel high pressure liquid chromatography to give the following compound.

Compound 2C (A)

Preparation of the above compound was accomplished as provided in the following description.

Compound A having the following formula was used as the starting material in step (a) below.

(a) Compound A (7.5 g, 0.013 mole) was dissolved in 100 ml of dry tetrahydrofuran. The solution was cooled to 5°–10° C. and sodium hydride (0.54 g, 0.014 mole, 60% oil dispersion) was added portionwise. After the addition was complete, the mixture was stirred for 1.5 hours warming to 20° C. The pale green solution was cooled to 10° C. and di-tert-butyl dicarbonate (3.35 g, 0.015 mole) in 30 ml of tetrahydrofuran was added dropwise over one-half hour. The reaction mixture was then stirred at room temperature for one-half hour. TLC showed no more starting compound A and one new spot. The reaction mixture was filtered through Celite and evaporated to dryness to give 8.23 g (92% yield) of the t-butyoxycarbonyl-substituted leuco dye having the formula 4.2 grams (0.006 mole) of Compound 2C was dissolved in a minimum amount of methylene chloride and stirred briskly with 2 g. of sodium bicarbonate at room temperature under nitrogen. 3.0 ml of phenylchloroformate dissolved in a few mls of methylene chloride was added dropwise over 30 minutes. The reaction mixture turned an intense magenta color. After several hours of stirring, silica gel TLC of a sample using 25% ethylacetate in hexane showed substantially complete conversion to a new colorless compound which turned magenta upon heating the TLC plate to 130°–180° C. The reaction mixture was purified by silica gel chromotography (elution with hexane followed by 5%, 10%, 15%, 20%, 25% ethylacetate in hexane) to give the title compound as a light pink solid (3.74 g; 76% by weight yield).

The aforementioned heat sensitive dye compounds are originally colorless and absorb radiation at different predetermined wavelengths in the visible wavelength range such as yellow, magenta and cyan colored light. The light absorbed by the respective heat sensitive compounds is converted into heat and the heat initiates an irreversible unimolecular fragmentation reaction to affect the transformation of the dye compounds from colorless to their respective yellow, magenta and cyan colors. Thus, the aforementioned examples for heat sensitive dye compounds are all originally colorless and transformed into respective colors by the absorption and conversion of light into heat.

Other heat sensitive organic dye compounds which would be equally satisfactory for the layers 22, 24 and 26 are originally colored and convert absorbed light into heat which initiates an irreversible unimolecular fragmentation reaction to affect the bleaching of the dye compounds so as to become colorless.

One example of such a heat sensitive dye compound is shown by the following formula for a cyan colored dye.

(B)

(b) The leuco dye prepared above (70 mg., 0.102 mmole) was dissolved in dry methylene chloride (3 ml) and p-chloranil (2 equivalents, 50 mg) was added. A few drops of methanol were added to aid solubility and the mixture was allowed to stir at room temperature until TLC (methylene chloride/hexane 2:1) showed that consumption of starting material was complete (2 hours). The solvents were evaporated and the residue triturated well with ethyl acetate and toluene to remove excess p-chloranil. The crude xanthene was then redissolved in methylene chloride, and one equivalent of distilled trimethylchlorosilane (13 μl) was added all at once. TLC (3% methanol in methylene chloride) showed a quantitative change in $R_f$ of the cyan spot in 3–5 minutes, and the reaction mixture was evaporated and subjected to high vacuum.

The crude dye product was applied to a flash silica gel column with methylene chloride to remove non-dye impurities. Further elution with 5% methanol in methylene chloride and collection of appropriate fractions gave 35 mg (48%) of the title compound. NMR was consistent with the proposed structure. $\lambda_{max}$ 665 nm/Epsilon 68,000 as measured in methanol.

Compound A was synthesized according to the procedure set forth in Example 1 of U.S. Pat. No. 4,258,118.

Thus, the imaging layers 22, 24 and 26 may comprise heat sensitive dye compounds which either change from a colorless condition to a colored condition by the absorption of heat or, alternately, from a colored condition to a colorless condition and may be used in any combination in the color imaging layers 22, 24 and 26. The color imaging layers 22, 24 and 26 may therefore comprise heat sensitive dye compounds which all change from a colorless condition to a colored condition in response to the absorption of heat or, alternatively, heat sensitive dye compounds which all change from a colored condition to a colorless condition in response to the absorption of heat or, alternatively, a mixture of imaging layers where one or more of the heat sensitive dye compounds changes from a colorless condition to a colored condition in response to the absorption of heat while the remaining heat sensitive dye compounds change from a colored condition to a colorless condition in response to the absorption of heat.

The laminar structure of the identification card 10 as shown in FIG. 2 may also contain additional layers (not shown) as is well known in the art, for example, a subbing layer to improve adhesion to the supporting substrate, interlayers for thermally insulating the imaging layers from each other, an antiabrasive top coat layer or other auxiliary layers.

Usually, each layer of heat sensitive dye compound 22, 24, 26 contains a binder that is formed by combining the heat sensitive compound and a binder in a common solvent, applying a layer of coating composition to the metallized layer 20 and then drying. The coating composition may also contain dispersing agents, plasticizers, defoaming agents, coating aids and materials such as waxes. Any of the binders commonly employed in heat sensitive recording elements may be employed provided that the binder selected is inert, i.e., does not have any adverse effect on the heat sensitive compound incorporated therein. Also, the binder should be heat stable at the temperatures encountered during image formulation, and it should be transparent so that it does not interfere with viewing of the color image. Examples of binders that may be used include polyvinyl alcohol, polyvinyl pyrrolidone, methyl cellulose, cellulose acetate butyrate, copolymers of styrene and butadiene, polymethyl methacrylate, copolymers of methyl and ethyl acrylate, polyvinyl acetate, polyvinyl chloride and polyvinyl butyral. In addition, the imaging layers 22, 24 and 26 may contain different infrared absorbers which can be selected to absorb radiation at different predetermined wavelengths above 700 nanometers so that each imaging layer may be exposed separately and independently of the others by using infrared radiation at the particular wavelengths selectively absorbed by the respective infrared absorbers. As an illustration, the layers of heat sensitive dye compounds for forming yellow, magenta and cyan may have infrared absorbers associated therewith that absorb radiation at 780 nanometers, 820 nanometers and 860 nanometers, respectively, and may be addressed by laser beam sources, for example, infrared laser diodes emitting laser beams at these respective wavelengths so that the yellow imaging layer 22 can be exposed independently of the magenta and cyan imaging layers 24 and 26, the magenta imaging layer 26 can be exposed independently of the yellow and cyan imaging layers 22 and 24, and the cyan imaging layer 24 can be exposed independently of the yellow and magenta imaging layers 22 and 26 in a manner to be more fully described in the following discussion. Examples of infrared absorbing compounds that are well known in the art may be found in French Application for Letters Patent No. 83 09208 entitled "Element For Optical Recording Through Thermal Coloring and the Procedure For Its Manufacture", by A. Morinaka et al., published Feb. 12, 1983.

Figure 4:
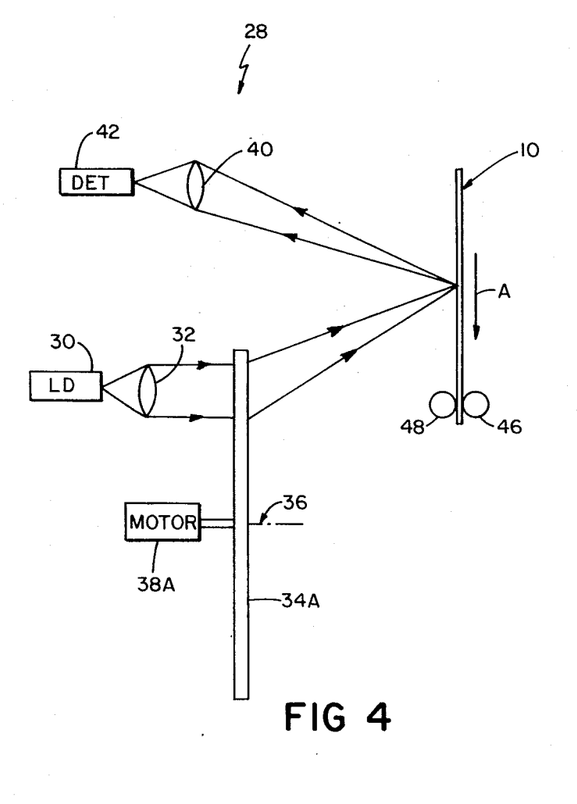
FIG. 4 is a diagrammatic view for the laser printing and scanning apparatus of this invention.

Referring now to FIG. 4, there is shown a block diagram for a laser printing system that may be utilized to expose the identification card in the three aforementioned areas 12, 14 and 16 which contain, respectively, a color picture of the cardholder, colored visually readable text and optically encoded digital data. Electronic signal information corresponding to either the picture, colored text or digital data may be applied as shown to a video data interface 50 from whence the electronic signal information is directed to a microprocessor 52 and a modulator 54 as well as to a fast scan generator 56 and a slow scan driver and indexer 58. The output from the modulator 54, in turn, controls the output from three laser diodes which as previously discussed provide respective light outputs of 780 nanometers, 820 nanometers and 860 nanometers corresponding to the light absorption characteristics of the infrared absorbers in the three imaging layers 22, 24 and 26, respectively. The light beam outputs from the laser diodes 30, in turn, are shaped and focused by appropriate beam optics 32 to provide a single composite light beam which may be scanned in one direction across the face of the identification card 13 by a beam deflector 34. The beam deflector 34 may comprise any standard optical scanning device such as a galvano controlled scanning mirror or a multifaceted rotating drum. Alternatively, the beam deflector may comprise a holographic disk in the manner of this invention as will be more fully described in the following discussion. The beam deflector 34 is driven by way of a drive motor 38 from the control signal provided by the fast scan generator 56. The identification card 10, in turn, is held by a card transport device 44 which operates to physically displace the identification card 10 in a direction transverse to the direction in which the composite laser beam is deflected by the beam deflector 34. The card transport device 44, in turn, is controlled by the slow scan driver and indexer 58. Thus, in this manner there is provided a means by which a composite laser beam may be raster scanned across the face of the identification card 10 to expose the picture, colored text and digital data storage areas 12, 14 and 16.

The laser diodes 30 are preferably of the aluminum gallium arsenide type having different concentrations of aluminum, gallium and arsenide which determine the three aforementioned wavelengths of 780 nanometers, 820 nanometers and 860 nanometers. That portion of the electronic signal information corresponding to the pictorial image and the colored text may utilize all three of the laser diodes 30 to expose all of the imaging layers 22, 24 and 26 simultaneously in a single raster scan controlled by the beam deflector 34 and card transport 44. Thus, the infrared absorbing compound associated with each respective imaging layer absorbs the appropriate wavelength laser light to transform the corresponding heat sensitive dye compound either from its initially colorless condition to its respective colored condition or, alternatively, from its initial colored condition to a colorless condition.

In an alternative embodiment, the same infrared absorbing compound may be used in association with two or more of the superposed imaging layers 22, 24 and 26 and each imaging layer may be exposed by utilizing the beam optics 32 to control the depth of focus of each of the laser beams. For example, if the same infrared absorbing compound were utilized in each of the imaging layers 22, 24 and 26, then the concentration of infrared absorber in each of the imaging layers would absorb approximately the same amount of laser beam energy, and the focusing depth of each one of the laser diodes 30 would be controlled so as to address a particular one of the imaging layers 22, 24 or 26. It will also be well understood that controlling the focusing depth of each one of the laser diodes 30 to address each one of the imaging layers 22, 24 or 26 separately may be carried out in combination with the use of infrared absorbers that selectively absorb at different wavelengths as previously described thereby eliminating the necessity for critically adjusting the concentration of the infrared absorbers in each of the imaging layers 22, 24 or 26. In addition, it will be well understood that only one of the laser diodes 30 could also be used to independently address each of the imaging layers 22, 24 or 26 by controlling the focusing depth of the one laser diode being used.

Although the laser scanning apparatus of FIG. 4 preferably utilizes the laser diodes which emit radiant energy in the non-visible spectrum, the invention is by no means so limited and alternatively gas lasers which emit radiant energy in the visible spectrum may be utilized to directly transform the yellow, cyan and magenta imaging layers 22, 24 and 26, respectively. As is readily apparent, if gas lasers emitting respectively yellow, cyan and magenta light are utilized, the infrared absorbing dyes would not be included in the respective imaging layers. It will also be well understood that in place of the lasers other well known thermal recording heads or thermal pens could be utilized to expose either the pictorial image portion 12 or the identification card 10.

Figure 5:
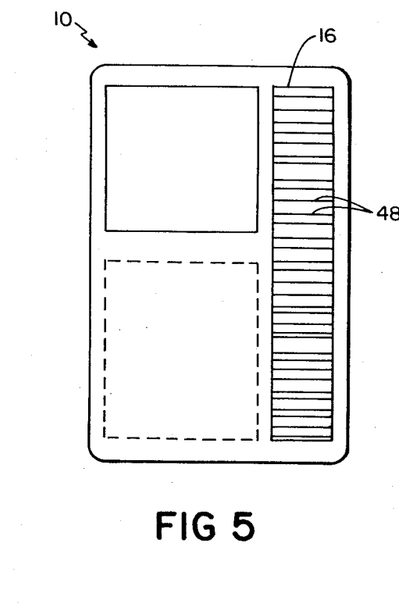
FIG. 5 is a plan view of the identification card of FIG. 1 diagrammatically showing the lines of optically encoded digital data.

Referring now to FIG. 5 where like numerals designate previously described elements there is shown a diagrammatic view for a laser scanning apparatus that may be utilized to encode digital data on the optically encoded data strip 16 of the identification card 10. In a preferred embodiment a single laser diode 30 provides a laser beam of 820 nanometers to be absorbed by the top magenta colored imaging layer 26. As is readily apparent, the magenta heat sensitive dye compound has associated therewith an infrared absorber which absorbs incident radiation at 820 nanometers. The beam shaping and focusing optics as shown at 32 direct the laser beam to a holographic disk 34A which is rotatably driven about its center axis 36 by way of a motor 38A. Rotation of the holographic disk 34A operates to provide the fast scan along digital data encoding lines as shown at 48 in FIG. 6. The identification card 10, in turn, may be translated vertically in the direction of the arrow A by a pair of drive rollers as shown at 46 and 48 to achieve the slow scan along the length of the data strip 16.

Optical data recording is accomplished by controlling the laser diode 30 to provide sufficient radiant energy to physically deform or ablate a spot in the magenta colored imaging layer 26. The deformed spot will have a substantially reduced reflectivity since incident light will be diffusely reflected by the deformation thereby scattering the returning light. The optically encoded data may thereafter be read by the apparatus of FIG. 5 utilizing the same laser diode 30, holographic disk 34A and card transport system comprising rollers 46 and 48 to laser scan the optically encoded digital data strip 16 while simultaneously reading the reflections therefrom with a photodetector 42 having appropriate beam shaping and focusing optics 40. The identification card 10 of this invention does not require post write processing before it can be read and can be read immediately after laser writing. Therefore, it has the "direct read after write" capability commonly known as "DRAW".

Optically encoding digital data along the data strip 14 of the identification card 10 in the aforementioned manner by physical deformation of one of the imaging layers allows for the subsequent retrieval of the optically encoded digital data by readers employing a single laser diode having a beam wavelength characteristic corresponding to the beam wavelength characteristic of the laser diode that originally encrypted the digital data. However, since deforming one of the imaging layers requires more radiant energy than that required to affect a color transformation, digital data could also be optically encoded along the data strip 14 by simply affecting a color change in one of the imaging layers utilizing only one of the laser diodes 30. For this case, it would be preferred to utilize one of the aforementioned heat sensitive dye compounds which is transformed from a colored state to a colorless state upon the absorption of heat energy. In this manner there can be provided a colorless hole along the data strip which exhibits a substantially higher reflectivity by virtue of the light being reflected from the metallized layer 20. It will be well understood that since no transformations are made by heat in the infrared absorbing substances, a visible light laser such as a gas laser must be utilized to read the digital data out of the data strip 14.

In addition digital data may be stored in each of the three imaging layers 22, 24 and 26 utilizing the three different laser diodes 30 which emit radiant energy at 780, 820 and 860 nanometers, respectively, to transform colorless spots in the three imaging layers. Thus, each imaging layer 22, 24 and 26 may be optically encoded with digital data to triple the volume of digital data that could otherwise be optically recorded for the data strip 16. Again, it will be well understood that since the infrared absorbing substances undergo no transformation in response to the absorption of heat, the optically encoded digital data must be read out using visible light lasers such as gas lasers that emit magenta, cyan and yellow colored light, respectively, to read the optical data stored in the corresponding magenta, cyan and yellow colored layers.

Thus, in the manner of this invention, there is provided an identification card having a single media suitable for recording pictorial colored images, colored text and digital data with one recording apparatus, i.e., a laser scanning printer. In addition, the identification card media also includes the commonly known "DRAW" feature wherein the card may be read directly after writing without any post write processing. The laser scanning printer of this invention provides for a fast scan in a simple and economical manner through the use of a rotating holographic disk.

Other embodiments of the invention, including additions, subtractions, deletions and other modifications of the preferred disclosed embodiments of the invention, will be obvious to those skilled in the art and are within the scope of the following claims. For instance, rather than using superimposed imaging layers, the heat-sensitive compounds and associated infrared absorbers may be arranged in an array of side-by-side dots or stripes in a single recording layer.

What is claimed is:

1. An identification card comprising:
   a substrate;
   a first color imaging compound disposed in overlying relation with respect to said substrate and comprising a first radiation sensitive dye responsive to incident radiant energy within a first select range of spectral wavelengths for effecting a visually discernible change in the spectral absorption characteristics thereof;
   a second color imaging compound disposed in overlying relation with respect to said substrate and comprising a second radiation sensitive dye responsive to incident radiant energy within a second select range of spectral wavelengths different from said first select range of spectral wavelengths for effecting a visually discernible change in the spectral absorption characteristics thereof; and
   a third color imaging compound disposed in overlying relation with respect to said substrate and comprising a third radiation sensitive dye responsive to incident radiant energy within a third select range of spectral wavelengths different from said first and second select ranges of spectral wavelengths for effecting a visually discernible change in the spectral absorption characteristics thereof, at least one portion of said first, second and third imaging compounds being selectively exposed to radiant energy within said first, second and/or third select ranges to provide a visually discernible and understandable colored image and a second portion of said first, second and/or third imaging compounds outside said first portion being selectively exposed to radiant energy within said first, second and/or third select ranges to provide a non-visually understandable machine readable binary code.

2. The identification card of claim 1 wherein said first, second and third imaging compounds are heat sensitive and said radiant energy within said first, second, and third select ranges of wavelengths is converted to heat upon absorption by respective ones of said first, second, and third imaging compounds.

3. The identification card of claim 2 wherein said first, second, and third imaging compounds are disposed in overlying layers substantially coextensive with respect to each other and said substrate.

4. The identification card of claim 3 wherein each of said first, second, and third imaging compounds comprises an infrared absorbing substance for converting infrared radiation into heat.

5. The identification card of claim 3 wherein said second portion of said first, second, and/or third imaging compound layers is exposed to radiant energy within a selected range of spectral wavelengths and intensity to effect the physical deformation of a select one of said first, second, or third imaging compound layers.

6. The identification card of claim 3 wherein the spectral absorption characteristics of said first, second and third imaging compound layers initially provide a colored appearance for each of said imaging compound layers and are respectively transformed by incident heat radiation to provide a substantially colorless appearance for each of said imaging compound layers.

7. The identification card of claim 6 wherein there is disposed a reflective layer between said imaging compound layers and said substrate and said second portion of said first, second, and third imaging compound layers is exposed to radiant energy within selected different ranges of spectral wavelengths to transform selected spots on said first, second, and/or third imaging compound layers from their initial colored appearance to a substantially colorless appearance.

8. The identification card of claim 3 wherein said visually discernible and understandable image on said first portion of said first, second, and third imaging compound layers comprises a pictorial representation of the card holder and colored text.

9. A method for printing an identification card of the type comprising a plurality of color imaging compounds each of which responds to incident radiant energy within a different select range of spectral wavelengths by changing the spectral absorption characteristics thereof, said method comprising the steps of:
   scanning a composite laser light beam having spectral wavelengths within said different select ranges of spectral wavelengths across a first portion of the identification card while simultaneously modulating the intensity of each portion of said composite laser light beam within one of said select ranges of spectral wavelengths to selectively expose said first, second, and third imaging compounds within said first portion to provide a visually discernible colored image; and
   scanning at least one laser light beam having spectral wavelengths within a select range of wavelengths across a second portion of the identification card while simultaneously modulating the intensity of said one laser light beam to selectively expose at least one of said first, second and third imaging compounds within said second portion to radiant energy to record a non-visually understandable machine readable code.

10. The method of claim 9 wherein each of said color imaging compounds contains an infrared absorbing substance for converting infrared radiation into heat and each of said infrared absorbing substances has a different spectral absorption characteristics within selected ranges of spectral wavelengths, said method further comprising the steps of matching the selected ranges of spectral wavelengths for said composite laser light beam to the spectral absorption characteristics of said infrared absorbing substances.

11. The method of claim 10 wherein said machine readable code is recorded on said second portion of said credit card by a single laser light beam having a spectral wavelength characteristic within a select range of wavelengths matched to at least one of the selected ranges of wavelengths for one of said infrared absorbing substances, said single laser light beam being modulated at a sufficient energy level to effect a physical deformation in the color imaging compound associated with said matching infrared absorbing substance.

12. The method of claim 10 wherein said machine readable code is recorded on said second portion of said credit card by a plurality of laser light beams each having a different spectral wavelength characteristic, said method further comprising the step of matching the selected wavelength characteristics for each of said laser light beams to a different one of the spectral absorption characteristics of said infrared absorbing substances so that each one of said laser light beams records said machine readable code on a different one of said color imaging compounds.

13. The method of claim 9 wherein said scanning steps comprise scanning at high speed by rotating a holographic light transmitting disk across the path of the laser light beam and scanning at comparatively slower speed in a direction generally orthogonal to the direction of high speed scanning by displacing the identification card relative to the laser light beam.

14. The method of claim 8 further comprising the steps of selectively varying the focus of the laser beams so as to concentrate the radiant energy therefrom at select color imaging compounds.

15. A method for printing an identification card of the type comprising a plurality of color imaging layers each of which responds to incident radiant energy within a different select range of visible wavelengths by changing the spectral absorption characteristics thereof, each imaging layer further including substantially the same infrared absorbing material for converting infrared radiation into heat, said method comprising the steps of:
  scanning a laser light beam having a spectral wavelength characteristic corresponding to the spectral absorbing characteristic of the infrared absorbing material across a first portion of the identification card while simultaneously modulating the intensity and focus of the laser light beam to selectively expose different color imaging layers within the first portion to provide a visually discernible colored image; and
  scanning the laser light beam across a second portion of the identification card while simultaneously modulating the intensity and focus to selectively expose at least one of said imaging layers within said second portion to radiant energy to record a non-visually understandable machine readable code.

16. The method of claim 15 wherein the laser light beam is focused to address a select one of said imaging layers in the second portion of the identification card and the intensity of the laser light beam is modulated at a sufficient energy level to effect a physical deformation in the color imaging layer so addressed.

17. The method of claim 15 wherein the laser light beam is selectively focused to address each one of said imaging layers in the second portion of the identification card and record thereon the machine readable code.

18. The method of claim 15 wherein said scanning steps comprise scanning at high speed by rotating a holographic light transmitting disk across the path of the laser light beam and scanning at comparatively slower speed in a direction generally orthogonal to the direction of high speed scanning by displacing the identification card relative to the laser light beam.

19. An identification card comprising:
  a substrate; and
  at least one imaging compound layer disposed in coextensive overlying relation with respect to said substrate and comprising a heat sensitive dye responsive to incident radiant energy within a select range of spectral wavelengths whereby said radiant energy converted to heat upon absorption by said color imaging compound so as to effect a visually discernible change in the spectral absorption characteristic of said color imaging compound, at least one portion of said imaging compound being selectively exposed to radiant energy within said select range of spectral wavelengths to provide a visually discernible and understandable image and a second portion of said imaging compound outside said first portion being selectively exposed to radiant energy within said select range of spectral wavelengths to provide a non-visually understandable machine readable binary code.

20. The identification card of claim 19 wherein said imaging compound comprises an infrared absorbing substance for converting infrared radiation into heat.

21. The identification card of claim 20 wherein said second portion of said imaging compound is exposed to radiant energy of sufficient intensity to effect the physical deformation of said imaging compound layer.

22. The identification card of claim 20 wherein the spectral absorption characteristics of said imaging compound layer initially provides a colored appearance and is respectively transformed by incident heat radiation to provide a substantially colorless appearance.

23. The identification card of claim 22 wherein there is disposed a reflective layer between said imaging compound layer and said substrate.

24. The identification card of claim 20 wherein said visually understandable image on said first portion of said imaging compound layer comprises a pictorial representation of the card holder and colored text.

* * * * *